March 6, 1945.  M. SPERTUS  2,371,075
MAKING ARTIFICIAL FIBERS
Filed Aug. 2, 1943

INVENTOR.
MAURICE SPERTUS
BY
*Agent*

Patented Mar. 6, 1945

2,371,075

UNITED STATES PATENT OFFICE 2,371,075

MAKING ARTIFICIAL FIBERS

Maurice Spertus, Winnetka, Ill., assignor to Spertus Processes, Inc., Chicago, Ill., a corporation of Illinois Application August 2, 1943, Serial No. 497,096

10 Claims. (Cl. 18—54)

This invention relates to the art of making artificial fibers and more particularly to a method of making fibers consisting of thermoplastic material.

The general object of the invention is to provide a new method of making fibers consisting of thermoplastic synthetic resins, which method is simple and efficient, and permits the control of certain properties of the fibers to be produced by very simple measures.

At present, thermoplastic fibers are made almost exclusively by extrusion methods, often using the resin in dissolved form. It is an object of this invention to provide a method for making thermoplastic resin fibers which can be practiced without any extrusion dies or other extrusion machinery.

More specifically, it is an object of this invention to provide a method for manufacturing thermoplastic resin fibers which subjects a quantity of molten polymerized thermoplastic resin to a pulling action to cause disintegration of the molten material into a great number of simultaneously forming fibers.

Another object of the invention is to draw fibers from a solid piece of thermoplastic resin by bringing a portion of this piece of resin into a molten state and subjecting the molten material to a pulling action.

A further object of this invention is to provide a method of making thermoplastic fibers in which thermoplastic resin is contacted over a substantial area by a heating member suitable to be wetted by the resin when the latter is in a molten state, and the heating member and the molten material are moved apart to cause disintegration of the molten resin.

It is a further object of this invention to melt a portion of a solid piece of thermoplastic resin by contacting the piece of resin with a heating surface which is adapted to be wetted by the molten resin, so that a film of molten resin can be formed on said heating surface, and then to move the heating surface and the piece of resin apart, whereby a great number of fibers is formed between the heating surface and the solid piece of resin.

It is a still further object of the invention to provide a method of making thermoplastic fibers which permits control of the thickness of the fibers by varying the temperature conditions under which the process is performed.

A further object of the invention is to provide a method of making thermoplastic fibers in which the total volume of the fibers to be produced in one cycle of operation may be controlled by varying the thickness of the film deposited on the heating surface mentioned above.

Figure 1:
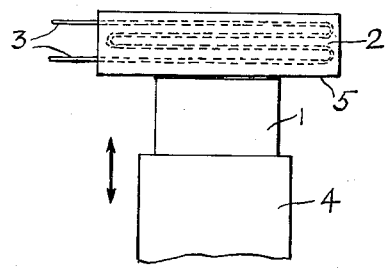
Figure 2:
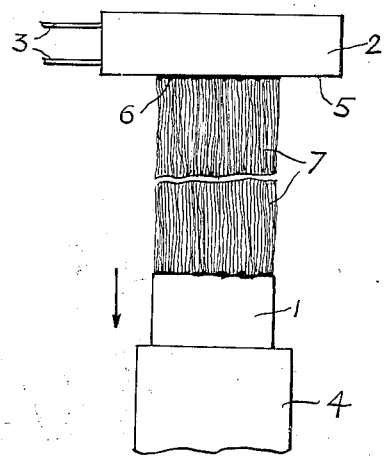

Further objects of the invention will appear as the description proceeds, reference being made to the accompanying drawing, in which Fig. 1 represents diagrammatically one phase and Fig. 2 another phase of a method illustrative of the invention.

In the drawing, 1 denotes a solid piece of thermoplastic resin in the form of a bar, plate or the like, and 2 a heater which in the example shown is an electric heater having a resistance element 3. The resin piece 1 is carried by a holder 4 which can be reciprocated by any suitable mechanism (not shown) so as to bring the resin piece 1 in and out of contact with the heater 2. The reciprocating mechanism may also provide for a feeding movement of the holder 4 after or during each cycle of operation in order to compensate for the reduction of length the resin piece 1 is undergoing during the production of fibers. Fig. 1 shows the bar or plate of thermoplastic resin 1 in close contact with a surface 5 of the heater 2. The heat supplied by the heater 2 to the piece of resin 1 causes melting of a portion of the piece 1 next to the heater 2. Thus, a film 6 of molten resin is formed on the surface 5 of the heater 2. If the resin piece 1 and the heater 2 carrying the film 6 are now moved apart so as to assume the positions shown in Fig. 2, a bridge consisting of thermoplastic material and having substantially the width of the piece 1 is formed and maintained between the heater 2 and the resin piece 1 which bridge, however, is not a coherent body but consists of a great number of individual fibers 7 extending parallel to each other. Under proper thermal conditions, which will be discussed presently, the piece of resin 1 can be carried a distance of several feet from the heater before the fibers 7 will break. When they break, they do it at the heater 2 while still being held at the other end by the solid resin piece 1. After the connection between the fibers 7 and the solid piece 1 has been severed by any suitable means, the piece 1 is brought back into contact with the heater 2 where a next portion of the thermoplastic piece 1 is melted. Part of this molten material is deposited on the heater 2 and, upon moving the bar or plate 1 away from the heater 2, the disintegration process above described is repeated, resulting again in the formation of a great number of fibers, etc.

Adapted to be used for the method of the invention are thermoplastic resins which can be brought into the molten stage without decomposing. As examples may be mentioned: polyesters, e. g., cellulose acetate and cellulose acetate butyrate, poly-ethers, e. g., ethyl cellulose, polyamides, vinyl polymers, e. g., vinyl chloride, vinyl acetate and vinylidene chloride, polyacrylics, e. g., methyl metacrylate, etc.

The temperature at which each of the various thermoplastic resins will develop fibers in the manner described lies, of course, above the melting point of the thermoplastic resin and it depends largely upon the extent of the polymerisation in the pure material. It can be lowered by the addition of plasticisers. To give a few examples: From a cellulose acetate butyrate of 35 to 38% butyryl content, I obtained fibers within a temperature range developed by the heater extending from 450 to 610° F., with an optimum (with regard to quality and quantity of the fibers produced) at approximately 500° F. From a cellulose acetate having an acetyl contents of 38 to 40% and a relatively small contents of plasticiser, I obtained satisfactory results between 550 and 625° F. For a vinylidine chloride the corresponding temperature range was 310 to 440°, for a vinyl chloride and also for vinyl acetate 315 to 470°, and for an ethyl cellulose 350 to 460°. A piece of methyl methacrylate, containing practically no plasticizer and having a density of 1.185, disintegrated into fibers within a temperature range extending from 460 to 650° F. Methods for determining the temperature ranges just given as well as the corresponding temperature range for any type of thermoplastic resins will be obvious to those skilled in the art. Such a method may consist, for instance, in bringing the particular thermoplastic in contact with a heater whose temperature can be regulated within appropriate limits, and gradually increasing the temperature of the heater starting at some temperature in the neighborhood of the temperature necessary for reaching the melting range of the particular thermoplastic material.

In order that a film of molten resin may be formed on the heating surface 5 against which the piece 1 of thermoplastic material is to be pressed, the surface 5 must be of such a character that it will be wetted by the particular thermoplastic resin when the same is in a molten state. The temperature ranges enumerated above were determined with a heater whose heating surface was made of copper; but other metallic or non-metallic surfaces are suitable as long as they fulfill the requirement just stated.

By varying the length of time for which the piece of thermoplastic resin is kept in close contact with the heating surface, the thickness of the film deposited upon the heating surface can be varied within certain limits, whereby the total volume of fibers which may be drawn in one cycle of operation can be varied.

The thickness of the fibers can be varied by varying the temperature of the heater and/or the speed at which the piece of resin and the heater are moved apart. The higher the temperature and the higher the speed the thinner will be in general the resulting fibers. Of some influence upon the thickness of the fibers is further the temperature of the atmosphere surrounding the developing fibers. A rise in the temperature of this atmosphere will have a tendency of thinning out the fibers.

Another factor having influence upon the properties of the resulting fibers is the direction in which the pulling action upon the film formed on the heater 2 is exerted. In the example shown in the drawing, the resin piece 1 is moved away from the heater 2 in a downward direction. It has been found that pulling in the downward direction is advantageous with respect to the quality of the fibers produced as well as to the volume of the fibers obtainable in one cycle of operation.

While I have shown and described a certain embodiment of the invention, I desire it to be understood that it is within the purview of this invention to employ other means and arrangements in practising the principle of this invention which resides in bringing about the disintegration into individual fibers of a molten mass of thermoplastic resin engaged at one side by a solid piece of such thermoplastic resin. It is intended, therefore, that the examples described and illustrated herein shall be interpreted in an illustrative and not in a limiting sense, except as set forth in the appended claims.

What I claim is:

1. The method of making synthetic fibers which comprises bringing part of the surface of a preshaped solid piece of synthetic polymerized thermoplastic material into contact with a heating member, maintaining said contact long enough for depositing as a film upon said heating member a relatively small quantity of material melted off said piece while the rest of said piece remains solid, and drawing a great number of simultaneously forming fibers from said film of molten material deposited on said heating member by moving apart said piece and said heating member, exerting thereby a pulling action upon said film with the unmelted piece of plastic material itself serving as a pulling means.

2. A method of making synthetic fibers which comprises advancing a preshaped solid piece of synthetic polymerized thermoplastic material so as to bring the forward end of said piece into contact with a heating member, maintaining said contact long enough for depositing as a film upon said heating member a relatively small quantity of material melted off said forward end of said piece while the rest of said piece remains solid, drawing a great number of simultaneously forming fibers from said film of molten material deposited on the heating member by withdrawing said piece from said heating member and thereby exerting a pulling action upon said film with the unmelted piece of plastic material itself serving as the pulling means.

3. A method of making synthetic fibers which comprises advancing a preshaped solid piece of synthetic polymerized thermoplastic material so as to bring the forward end of said piece into contact with a heating member, maintaining said contact long enough for depositing as a film upon said heating member a relatively small quantity of material melted off said forward end of said piece while the rest of said piece remains solid, drawing a great number of simultaneously forming fibers from said film of molten material deposited on the heating member by withdrawing said piece from said heating member and thereby exerting a pulling action upon said film with the unmelted piece of thermoplastic material itself serving as a pulling means, exerting further pulling action for drawing the fibers to a desired length, removing the fibers thus formed, and returning the shortened piece of thermoplastic material into contact with said heating member for depositing upon said heating member another small quantity of material melted off the forward end of said piece, this returning movement being large enough to include a feeding movement adapted to compensate for the reduction of length the piece of thermoplastic material undergoes during each cycle of operation.

4. A method of making synthetic fibers which comprises advancing a preshaped solid piece of synthetic polymerized thermoplastic material so as to bring the forward end of said piece into contact with a heating member, maintaining said contact long enough for depositing as a film upon said heating member a relatively small quantity of material melted off said forward end of said piece while the rest of said piece remains solid, drawing in a downward direction a great number of simultaneously forming fibers from said film of molten material deposited on the heating member by withdrawing said piece from said heating member and thereby exerting a pulling action upon said film with the unmelted piece of plastic material itself serving as a pulling means.

5. A method of making synthetic fibers which comprises bringing part of the surface of a preshaped solid piece of cellulose derivative thermoplastic material into contact with a heating member, maintaining said contact long enough for depositing as a film upon said heating member a relatively small quantity of material melted off said piece while the rest of said piece remains solid, and drawing a great number of simultaneously forming fibers from said film of molten material deposited on the heating member by moving apart said piece and said heating member, exerting thereby a pulling action upon said film with the unmelted piece of cellulose derivative plastic itself serving as a pulling means.

6. A method of making synthetic fibers which comprises advancing a solid preshaped piece of cellulose derivative thermoplastic material so as to bring the forward end of said piece into contact with a heating member, maintaining said contact long enough for depositing as a film upon said heating member a relatively small quantity of material melted off said forward end of said piece while the rest of said piece remains solid, drawing a great number of simultaneously forming fibers from said film of molten material deposited on the heating member by withdrawing said piece from said heating member and thereby exerting a pulling action upon said film with the unmelted piece of cellulose derivative plastic itself serving as a pulling means.

7. A method of making synthetic fibers which comprises advancing a preshaped solid piece of cellulose acetate butyrate so as to bring the forward end of said piece into contact with a heating member, maintaining said contact long enough for depositing as a film upon said heating member a relatively small quantity of material melted off said forward end of said piece while the rest of said piece remains solid, drawing a great number of simultaneously forming fibers from said film of molten material deposited on the heating member by withdrawing said piece from said heating member and thereby exerting a pulling action upon said film with the unmelted piece of cellulose acetate butyrate itself serving as a pulling means.

8. The method of making synthetic fibers which comprises bringing part of the surface of a preshaped solid piece of cellulose derivative thermoplastic material into contact with a heating member, maintaining said contact long enough for depositing as a film upon said heating member a relatively small quantity of material melted off said piece while the rest of said piece remains solid, drawing a great number of simultaneously forming fibers from said film of molten material deposited on the heating member by moving apart said piece and said heating member and thereby exerting a pulling action upon said film with the unmelted piece of cellulose derivative plastic itself serving as a pulling means, exerting further pulling action for drawing the fibers to a desired length, removing the fibers thus formed, and returning the shortened piece of cellulose derivative plastic and said heating member into contact with each other for depositing upon said heating member another small quantity of material melted off said piece, this returning movement including a feeding movement adapted to compensate for the reduction of length the piece of cellulose derivative plastic undergoes during each cycle of operation.

9. The method of making synthetic fibers which comprises advancing a preshaped solid piece of cellulose acetate butyrate so as to bring the forward end of said piece into contact with a heating member developing a temperature of approximately 500° F., maintaining said contact long enough for depositing as a film upon said heating member a relatively small quantity of material melted off said forward end of said piece while the rest of said piece remains solid, and drawing a great number of simultaneously forming fibers from said film of molten material deposited on the heating member by withdrawing said piece from said heating member, exerting thereby a pulling action upon said film with the unmelted piece of cellulose acetate butyrate plastic itself serving as a pulling means.

10. A method of making synthetic fibers which comprises bringing part of the surface of a preshaped solid piece of synthetic polymerized thermoplastic material into contact with a heating member, maintaining said contact long enough for depositing as a film upon said heating member a relatively small quantity of material melted off said piece while the rest of said piece remains solid, drawing a great number of simultaneously forming fibers from said film of molten material deposited on the heating member by moving apart said piece and said heating member and thereby exerting a pulling action upon said film with the unmelted piece of thermoplastic material itself serving as a pulling means, exerting further pulling action for drawing the fibers to a desired length, removing the fibers thus formed, and returning the shortened piece of thermoplastic material and said heating member into contact with each other for depositing upon said heating member another small quantity of material melted off said piece, this returning movement including a feeding movement adapted to compensate for the reduction of length the piece of thermoplastic material undergoes during each cycle of operation.

MAURICE SPERTUS.